(12) United States Patent
Baxivanelis et al.

(10) Patent No.: US 7,066,693 B2
(45) Date of Patent: Jun. 27, 2006

(54) DEVICE FOR CONNECTING TWO TOOL PARTS

(75) Inventors: Konstantin Baxivanelis, Besigheim (DE); Achim Rothenstein, Fellbach (DE)

(73) Assignee: Komet Praezisionswerkzeuge Robert Breuning GmbH, Besigheim (DE)

( * ) Notice: Subject to any disclaimer, the term of this patent is extended or adjusted under 35 U.S.C. 154(b) by 384 days.

(21) Appl. No.: 10/203,197

(22) PCT Filed: Jan. 8, 2001

(86) PCT No.: PCT/EP01/00098

§ 371 (c)(1),
(2), (4) Date: Dec. 9, 2002

(87) PCT Pub. No.: WO01/57410

PCT Pub. Date: Aug. 9, 2001

(65) Prior Publication Data

US 2003/0138303 A1    Jul. 24, 2003

(30) Foreign Application Priority Data

Feb. 4, 2000 (DE) ............................ 100 04 895

(51) Int. Cl.
*B23B 51/00* (2006.01)
(52) U.S. Cl. .................. 408/143; 408/239 R; 408/226
(58) Field of Classification Search ................ 408/143, 408/226, 238, 239 R, 239 A; 74/574
See application file for complete search history.

(56) References Cited

U.S. PATENT DOCUMENTS

| | | | | |
|---|---|---|---|---|
| 5,573,335 A | * | 11/1996 | Schinazi | 374/141 |
| 6,280,126 B1 | * | 8/2001 | Slocum et al. | 409/141 |
| 6,352,395 B1 | * | 3/2002 | Matsumoto et al. | 409/234 |
| 6,537,000 B1 | * | 3/2003 | Weck | 409/141 |

FOREIGN PATENT DOCUMENTS

| | | |
|---|---|---|
| DE | 1 073 832 | 7/1960 |
| DE | 39 24 696 | 2/1991 |
| DE | 43 07 497 | 9/1994 |
| DE | 44 00 425 | 7/1995 |
| DE | 197 24 030 | 12/1998 |
| GB | 942 071 | 11/1963 |
| JP | 61056822 A * | 3/1986 |

* cited by examiner

*Primary Examiner*—Boyer D. Ashley
*Assistant Examiner*—Ali Abdelwahed
(74) *Attorney, Agent, or Firm*—Flynn, Thiel, Boutell & Tanis, P.C.

(57) ABSTRACT

The invention relates to a device for releasably connecting two coaxially aligned tool parts (1, 2) which can be axially pressed against each other on separating surfaces (36, 38) that face each other with a clamping device. According to the invention, at least one of the separating surfaces (38) is divided into several axially rigid and torsionally soft bearing segments (50) which are spaced in a peripheral direction, in order to dampen the torsional oscillations that occur during the work process and reduce noise.

21 Claims, 3 Drawing Sheets

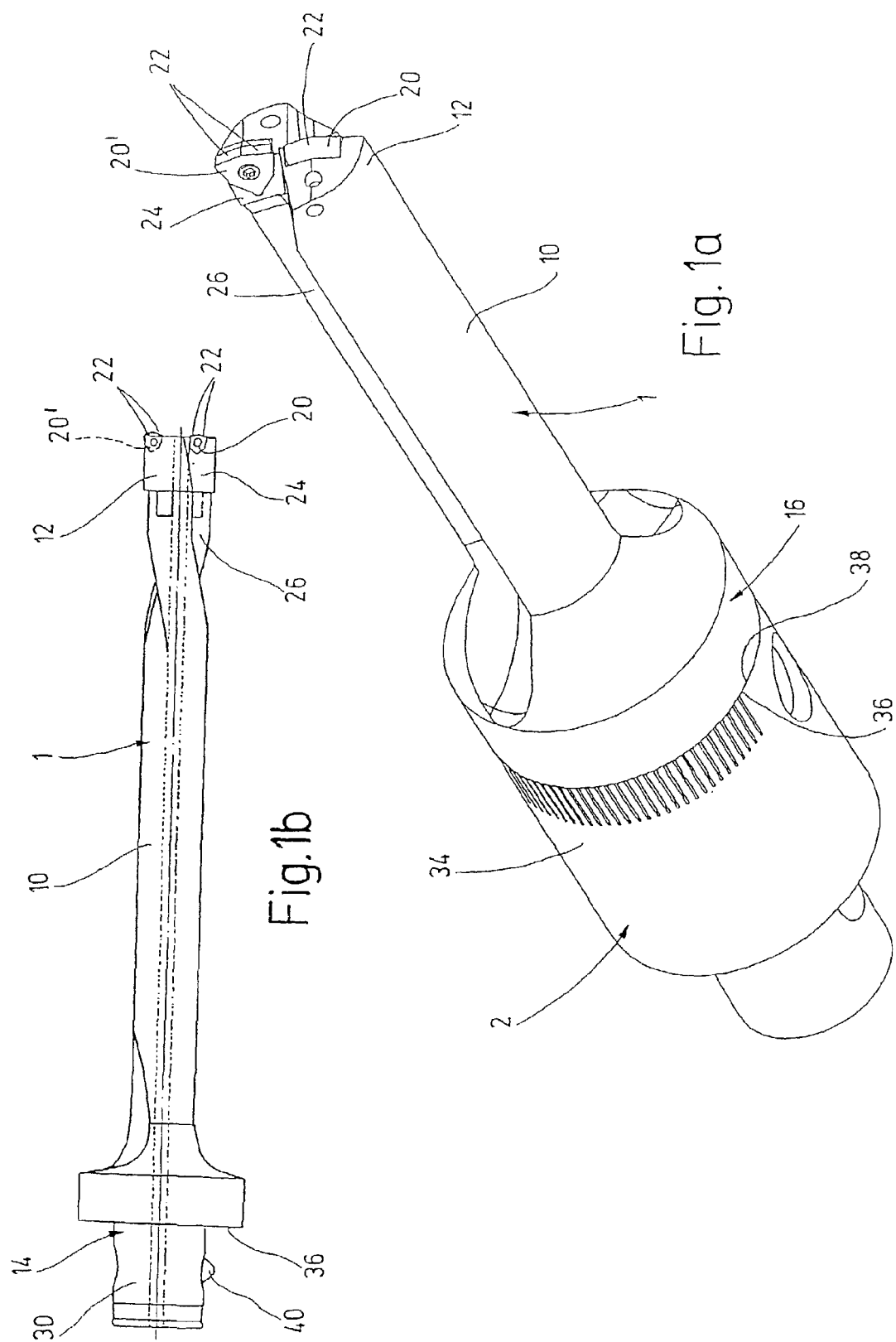

DEVICE FOR CONNECTING TWO TOOL PARTS

The invention relates to a device for the releasable connection of two coaxially aligned tool parts which can be pressed axially against one another at opposing separating surfaces by means of a clamping device.

The device of the invention is designated for both the releasable connection of tools to a machine spindle (cutting area) and also for the connection of tool parts among one another (separating area). The term "tool parts" refers in particular to drill rods, extension and reduction pieces, adjusting heads, spindle attachment flanges and machine spindles.

When using boring tools with disposable inserts an unacceptable noise emission often occurs. This concerns mainly tool parts with a planar-surface bracing. The noise is created by an oscillation stimulation of the multi-body system "tool-chuck-machine" due to dynamic cutting forces. The multi-body system is stimulated broadbandediy by periodic or impulse-like machining forces. This stimulation spectrum resulting from the chip formation leads to an oscillation of the tool. Self-oscillated torsion and bending oscillations thereby primarily occur. Micromovements in the joint gap between the tool parts occur thereby and thus an alternating mounting and breaking loose of the tool parts according to the stick-slip effect and thus undesired body-noise emissions in a high-frequency range occur. It must thereby be taken into consideration that the noise created during the machining operation goes along with micromovements, which can lead to undesired chatter marks in the workpiece. In order to avoid this disadvantage, it has already been suggested (DE-A 44 00 425) that the tool parts are axially separated from one another with the inter-clamping of an elastomer material bridge and can be limitedly rotated against one another under an elastic deformation of the material bridge. A significant disadvantage of this construction is that the material bridge can be axially deformed so that the achievable machining precision leaves much to be desired. Also the material bridge enables a radial deflection of the tool, which in particular in the case of long tools can result in intolerable machining errors.

Starting out from this, the basic purpose of the invention is to provide a connecting device of the above-identified type, which leads to an oscillation damping and thus a reduction of the noise emission during operation and guarantees at the same time a high precision in machining.

To attain this purpose, the combination of characteristics disclosed in claims 1 and 13 is suggested. Advantageous embodiments and further developments of the invention result from the dependent claims.

The solution of the invention is based on the thinking that besides a torsionally yieldable connection of the tool parts in the area of the connecting device, in addition, an axial stiffness is provided. Only then is it possible to meet the high demands for precision in machining. In order to achieve this, it is suggested according to a first solution alternative that at least one of the separating surfaces of the tool parts, which are braced with one another, is divided into several axially rigid and torsionally yieldable bearing segments which are spaced from one another in peripheral direction.

A preferred embodiment of the invention provides that at least one of the tool parts has several essentially radially extending grooves which are spaced from one another in peripheral direction and are axially open toward the respective separating surface, and the separating walls of which, which are defined by their flanks, form the bearing segments. The separating surfaces can thereby be divided into several peripheral portions, of which two preferably diametrically opposite peripheral portions are divided into bearing segments, whereas the other, closed peripheral portions are axially set back relative to the bearing segments. It is assured with this measure that noise cannot be created in the area of the closed peripheral portions, which do not have any ability to bend and are therefore not torsionally yieldable. The grooves between the bearing segments can be filled with a deformable, preferably elastomer material.

A further advantageous embodiment of the invention provides that the grooves are created with a width which is constant in radial direction so that the separating walls have a wall thickness decreasing from the outside to the inside. The separating walls are thereby designed as transverse beams, which are connected in one piece at their base to the respective tool part. In order to achieve also in the case of relatively thick separating walls a connection which is yieldable in peripheral direction, the wall thickness of the separating walls is preferably weakened in the area of its base.

The separating surfaces, which can be braced against one another are designed advantageously planar-parallel or complementarily conically.

The invention can be used advantageously when one of the tool parts has a cylindrical or conical fitting pin and an annular surface annularly surrounding the fitting pin and forming the separating surface, and when on the other tool part is provided a cylindrical fitting bore in order to receive the fitting pin and a face which surrounds the fitting bore at its edge and forms the other separating surface. The axially rigid and torsionally yieldable bearing segments are hereby arranged advantageously on the tool part with the fitting bore, whereby the radial grooves are open axially toward the end face and radially outwardly and toward the fitting bore. A clamping bolt is advantageously provided in such a connecting device, which clamping bolt is movably arranged in a transverse bore of the fitting pin and has an internal or external cone at its ends. Furthermore two clamping members are provided there, which clamping members are diametrically opposite relative to the fitting bore, have an outer or inner cone pointing to the inside of the fitting bore, and can be braced key-like to the clamping bolt during the clamping operation under a reciprocal bearing pressure of the tool parts in the area of the separating surfaces. It is advantageous for this design when the separating surface of the tool part with the fitting bore is divided into the bearing segments outside of the peripheral portions housing the clamping members, and is closed in the peripheral portions housing the clamping members and is set back axially relative to the bearing segments.

A further advantageous or alternative embodiment of the invention provides that the tool parts can be pressed against one another at their separating surfaces with the inter-clamping of an annular, axially rigid and torsionally yieldable material bridge.

The material bridge is thereby advantageously closed off at its one face and is divided at its other face into several axially rigid and torsionally yieldable bearing segments which are spaced from one another in peripheral direction. It is thereby basically possible to connect the axial webs through a preferably elastomer binding means.

As an alternative to this, it is possible to provide the material bridge with two closed annular portions, which define the respective faces, and which are connected axially rigidly and torsionally yieldable by a number of radially continuous axial webs, which are spaced from one another in peripheral direction. The spaces between the webs can hereby form, for example, a rectangular, trapezoidal, circular or oval cross-sectional opening. A further modified embodiment provides that the material bridge is divided at its two faces into several axially rigid and torsionally yieldable bearing segments which are spaced from one another in peripheral direction, and engage one another meander-like or zigzag-like from both faces. The material bridge can also consist of a plurality of radially continuous axially rigid webs which are spaced from one another in peripheral direction, and which are connected torsionally yieldably by a preferably elastomer binding means.

The material bridge is according to an advantageous embodiment of the invention materially joined to one of the tool parts in the area of the separating surface.

The invention will be discussed in greater detail hereinafter in connection with exemplary embodiments schematically illustrated in the drawings, in which:

FIG. 1a is a diagrammatic illustration of two connected tool parts in form of a boring tool with an adapter piece;

FIG. 1b is a side view of the boring tool according to FIG. 1b without the connecting piece;

Figure 2A:
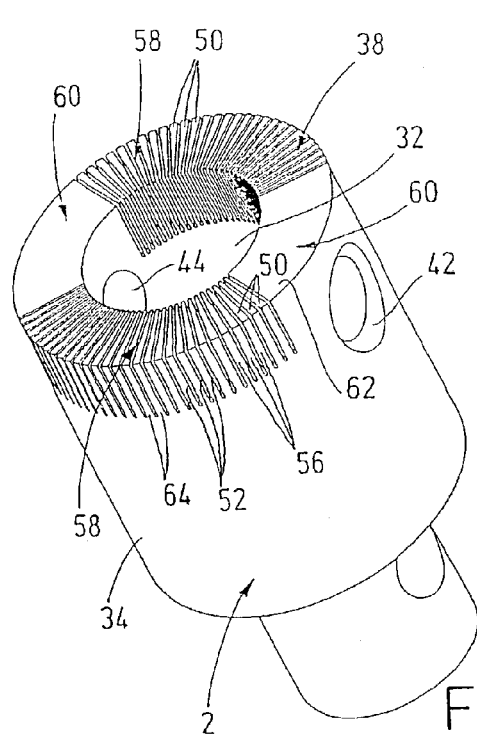
FIGS. 2a to 2d are diagrammatic illustrations of adapter pieces with damping portions of various designs.
Figure 2B:
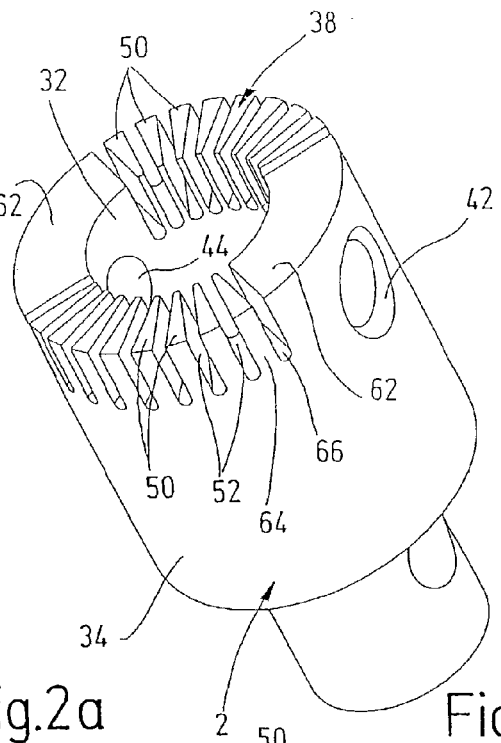
Figure 2C:
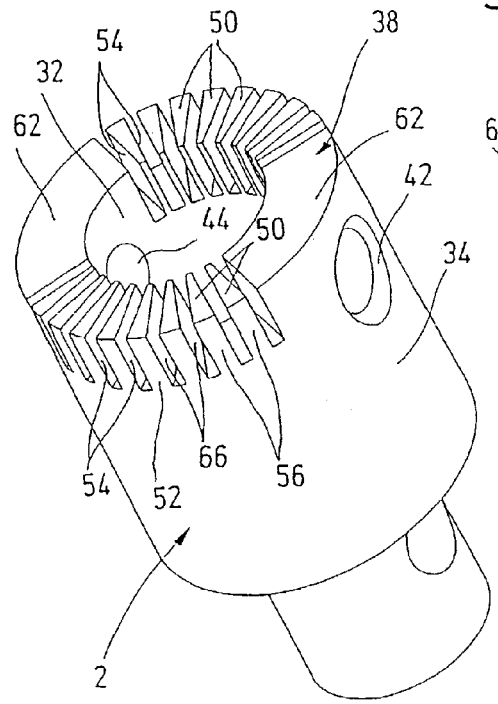
Figure 2D:
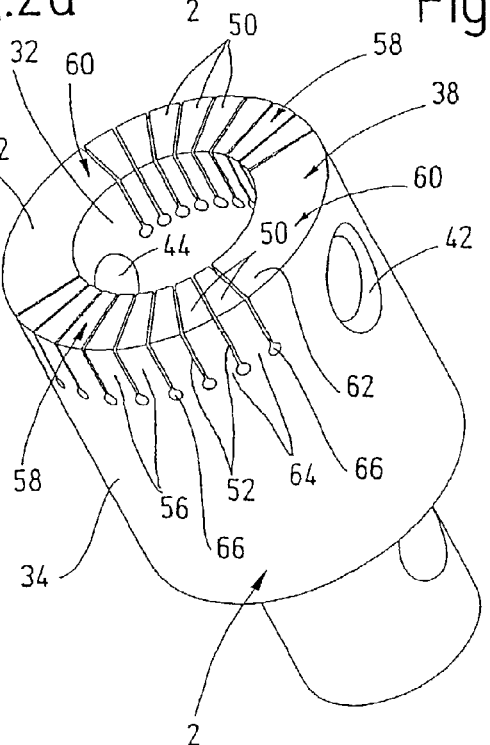

The boring tool illustrated in FIGS. 1a and 1b consists essentially of a shank 10, a drill bit 12 arranged at a terminal end face of the shank 10, and a connecting member 14 of a connecting device 16, which connecting member 14 is arranged on the end of the shank 10 opposite the drill bit 12.

The drill bit 12 has in the illustrated exemplary embodiment two hexagonal disposable inserts 20, 20' arranged at various radial distances from the shank axis, the active cutting edges 22 of which partially radially overlap in the working regions thereof. The disposable inserts are arranged in recesses of an axially parallel flank of a chip channel 24, which terminates at its rearward end in a chip flute 26 of the shank 10. The connecting device 16 consists essentially of a fitting pin 30, which axially projects beyond the rearward end of the boring tool 1, and a connecting sleeve 34 which projects axially beyond an adapter piece 2 or a machine spindle and has a fitting bore 32 therein, and a clamping mechanism in order to pull the fitting pin 30 into the fitting bore 32 of the connecting sleeve 34 and in order to create a planar-surface bracing between an annular separating surface 36 of the boring tool 1, which annular separating surface 36 surround the fitting pin 30, and an annular separating surface 38 of the adapter piece 2. The clamping mechanism consists, in the ABS-couplings (ABS=registered trademark of the company Komet) illustrated in the drawings, of a clamping bolt 40 movably arranged in a transverse bore of the fitting pin 30, and two not illustrated clamping screws which are guided in internal threads 42, 44 of the connecting sleeve 34 and are diametrically opposite one another. The clamping bolt 40 engages with its outer cone an inner cone of the adjacent clamping screw and has at its end opposite the outer cone an inner cone in order to receive an outer cone formed on the other clamping screw. In order to create the connection between the two tool parts 1, 2, one of the clamping screws is turned with the inter-clamping of the clamping bolt 40 against the other clamping screw. The thereby introduced clamping forces are converted through the conical bearing surfaces, due to an existing axis shift, into a movement which pulls the fitting pin 30 into the fitting bore 32. A planar-surface bracing between the separating surfaces 36 and 38 occurs upon a further tightening of the respective clamping screw, and thus the boring tool 1 is connected to the adapter piece 2. In order to carry out a drilling operation, the adapter piece 2 is rotated by a machine spindle to cause the disposable inserts 20, 20' to penetrate the workpiece creating the bore. Torsional oscillations are thereby created in the boring tool 1, which in the case of a relative movement in the area of the separating surface can result in a stick-slip effect and the formation of shrill sounds with high noise levels.

In order to reduce the noise level, the illustrated exemplary embodiments provide a damping feature creating a torsionally yieldable connection of the boring tool 1 to the machine spindle 2. The separating surface 38 of the connecting sleeve 34 is in the modified embodiments according to FIGS. 1 and 2 divided into several axially rigid and torsionally yieldable bearing segments 50 which are spaced from one another in peripheral direction. Several radially extending grooves 52, which are spaced from one another in peripheral direction and are axially open toward the separating surface 18, are for this purpose arranged in the connecting sleeve 34. The separating walls 56 of the grooves 52, which separating walls are defined by their flanks 54, form the bearing segments 50 at their respective free end faces. The separating surface 38 is divided into four peripheral portions 58, 60, of which the two diametrically opposite peripheral portions 58 are divided into the bearing segments 50, whereas the other peripheral portions 60 are closed and are axially set back with their faces 62 relative to the bearing segments 50. The separating walls 56 between the grooves are designed as transverse beams which are connected in one piece at their base 64 to the connecting sleeve 34, and which have a wall thickness decreasing radially from the outside to the inside (compare FIGS. 2a to 2d). To optimize the oscillation damping it is possible to vary the width and depth of the grooves 52, the wall thickness of the separating walls 56 and the geometric design of the base 66 of the groove and of the base 64 of the separating walls 56 (FIGS. 2a to 2d). The base 64 of the separating walls 56 is weakened in the case of FIG. 2d. In order to protect the grooves 52 against dirt, they can be filled with an elastomer material. The oscillation behavior can be additionally influenced with this measure.

The exemplary embodiments illustrated in FIGS. 1 and 2 have the advantage that they are compatible with standard tools without damping mechanisms and can thus be easily exchanged with them.

Figure 3:
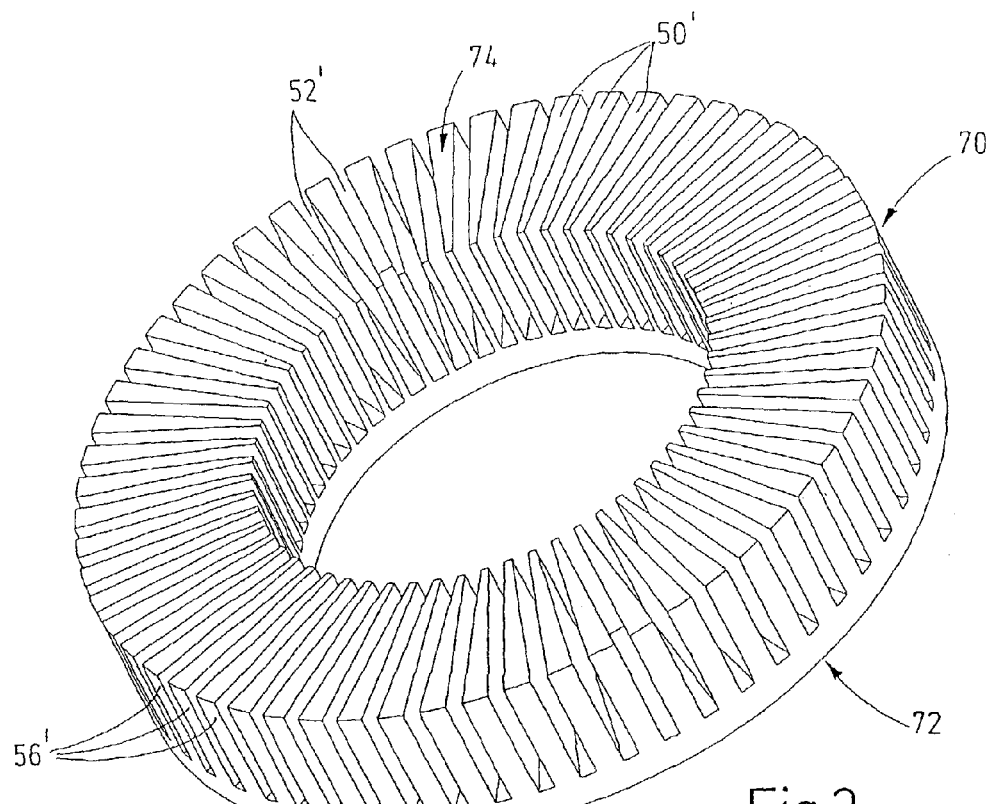
FIG. 3 is a diagrammatic illustration of a material bridge designed as a damping member.
Figure 4A:
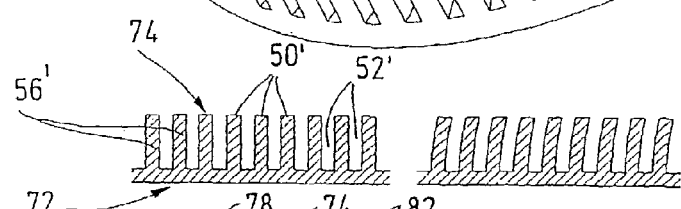
FIGS. 4a to 4f are cross-sectional illustrations of sections of six damping portions of various designs of an oscillation-damping material bridge corresponding to FIG. 3.

The exemplary embodiment illustrated in FIG. 3 shows an annular material bridge 70 which can be inserted between the separating surfaces 36, 38 of the tool parts 1, 2 and can be clamped between these parts during the clamping operation. The material bridge 70 is designed axially rigid and torsionally yieldable in peripheral direction. The bridge is for this purpose closed at its one face 72, and is divided at its other face into a plurality of axially rigid and torsionally yieldable bearing segments 50', which are spaced from one another in peripheral direction. The bearing segments are formed in the exemplary embodiment illustrated in FIGS. 3 and 4a by the faces of the separating walls 56' which separate the radial grooves 52' from one another. The left illustration of FIG. 4a shows the separating walls 56 in a non-stressed state. The separating walls 56 with their bearing segments 50 are upon the action of a torsional force acting in peripheral direction elastically deformed in the manner illustrated on the right in FIG. 4a. This deformation prevents a stick-slip effect in the area of the bearing surfaces and thus an undesired noise formation.

Figure 4B:
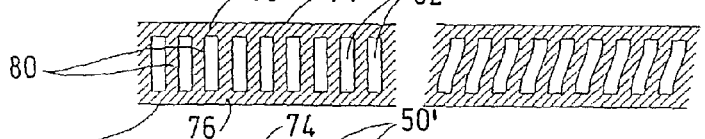

The cross-sectional illustrations 4b and 4f show further geometric design modifications of the material bridge 70, which also fulfill the conditions of an axially rigid yet flexible connection of the tool parts. The material bridge 70 has in the exemplary embodiment according to FIG. 4b two closed annular portions 76, 78 defining the faces 72, 74, which annular portions 76, 78 are connected axially rigid and torsionally yieldable by a plurality of radially continuous axial webs 89 which are arranged spaced from one another in peripheral direction. The left portion of FIG. 4b shows the material bridge with non-stressed axial webs 80, whereas the right illustration of FIG. 4b shows the axial webs under the action of a torsional force. Whereas the spaces between the axial webs 80 are designed rectangularly in cross section in the case of FIG. 4b, they are round or oval in the exemplary embodiments according to FIGS. 4d and 4e.

Figure 4C:
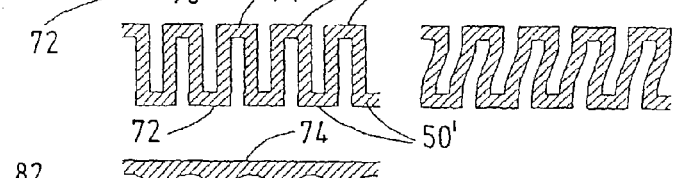
Figure 4D:
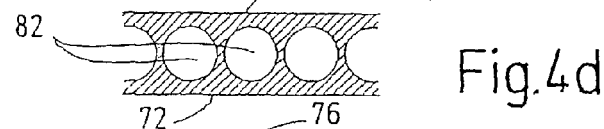
Figure 4E:
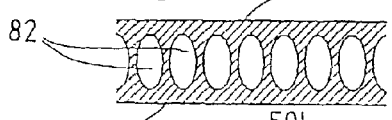
Figure 4F:
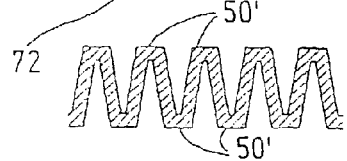

The material bridges are in the exemplary embodiments according to FIGS. 4c and 4f divided at their two faces 72, 74 into several axially rigid and torsionally yieldable bearing segments 50 which are spaced from one another in peripheral direction and engage one another meander-like (FIG. 4c) or zigzag-like (FIG. 4f) from the two faces. The left image of FIG. 4c shows the material bridge in a non-stressed state, whereas the right image shows how the material bridge distorts under the action of a torsional force.

In summary the following is to be stated: The invention relates to a device for the releasable connection of two coaxially aligned tool parts 1, 2 which can be pressed axially against one another at separating surfaces 36, 38, which face one another by means of a clamping device. In order to dampen the torsional oscillations occurring during operation and in order to reduce the generation of noise, the invention provides that at least one of the separating surfaces 38 is divided into several axially rigid and torsionally yieldable bearing segments 50 which are spaced from one anther in peripheral direction.

The invention claimed is:

1. A device for the releasable connection of two coaxially aligned tool parts, which can be pressed axially against one another at separating surfaces which face one another by a clamping device, wherein at least one of the separating surfaces is divided into several peripheral portions, of which at least two diametrically opposite peripheral portions are divided into several axially rigid and torsionally yieldable bearing segments which are spaced from one another in a peripheral direction, whereas the other peripheral portions are closed and are axially set back with their faces relative to the bearing segments.

2. The device according to claim 1, wherein at least one of the tool parts has several essentially radially extending grooves which are spaced from one another in a peripheral direction and are axially open toward the respective separating surface, and separating walls of the bearing segments define flanks of the grooves.

3. The device according to claim 2, wherein the separating walls have a wall thickness decreasing radially from the outside to the inside.

4. The device according to claim 1, wherein the separating surfaces of the tool parts, which face one another are planar-parallel or complementarily conical with respect to each other.

5. The device according to claim 1, wherein the tool parts include a friction-reducing coat in the area of their separating surfaces.

6. A device for the releasable connection of two coaxially aligned tool parts, which can be pressed axially against one another by a clamping device at separating surfaces which face one another, wherein at least one of the separating surfaces of one of the tool parts is divided into several axially rigid and torsionally yieldable bearing segments which are spaced from one another in a peripheral direction, and the one of the tool parts has several essentially radially extending grooves which are spaced from one another in a peripheral direction and are axially open toward the respective separating surface, and separating walls of the bearing segments define flanks of the grooves, and wherein the grooves are filled with an oscillation-damping material.

7. The define according to claim 6, wherein the oscillation-damping material comprises an elastomer material.

8. A device for the releasable connection of two coaxially aligned tool parts, which can be pressed axially against one another by a clamping device at separating surfaces which face one another, wherein at least one of the separating surfaces of one of the tool parts is divided into several axially rigid and torsionally yieldable bearing segments which are spaced from one another in a peripheral direction, and the one of the tool parts has several essentially radially extending grooves which are spaced from one another in a peripheral direction and are axially open toward the respective separating surface, and separating walls of the bearing segments define flanks of the grooves, wherein the separating walls comprise transverse beams connected in one piece at their base to the respective tool part.

9. A device for the releasable connection of two coaxially aligned tool parts, which can be pressed axially against one another at separating surfaces which face one another by a clamping device, wherein at least one of the separating surfaces of one of the tool parts is divided into several axially rigid and torsionally yieldable bearing segments which are spaced from one another in a peripheral direction, and the one of the tool parts has several essentially radially extending grooves which are spaced from one another in a peripheral direction and are axially open toward the respective separating surface, and separating walls of the bearing segments define flanks of the grooves, wherein wall thickness of the separating walls is weakened in an area of their base.

10. A device for the releasable connection of two coaxially aligned tool parts, which can be pressed axially against one another at separating surfaces which face one another by a clamping device, wherein at least one of the separating surfaces of one of the tool parts is divided into several axially rigid and torsionally yieldable bearing segments which are spaced from one another in a peripheral direction, and the one of the tool parts has several essentially radially extending grooves which are spaced from one another in a peripheral direction and are axially open toward the respective separating surface, and separating walls of the bearing segments define flanks of the grooves, wherein the one of the tool parts has a cylindrical or conical fitting pin and an annular surface which annularly surrounds the fitting pin and forms the one separating surface, and wherein the other tool part has a cylindrical fitting bore in order to receive the fitting pin and a face which surrounds the fitting bore at its edge and forms the other one of the separating surfaces.

11. The device according to claim 10, wherein the bearing segments are arranged on the tool part that has the fitting bore, whereby the several essentially radially extending grooves are open axially toward an end face and radially outwardly and toward the fitting bore.

12. The device according to claim 10, wherein a clamping bolt is movably arranged in a transverse bore of the fitting pin, and has an inner or outer cone at its ends, and wherein two clamping members which are diametrically opposite one another with respect to the fitting bore, are capable of being clamped wedge-like to the clamping bolt during a clamping operation via a reciprocal bearing pressure of the tool parts in an area of the separating surfaces.

13. The device according to claim 12, wherein the separating surface of the tool part which has the fitting bore is divided into the bearing segments outside of the peripheral portions that house the clamping members, and is closed in the peripheral portions that house the clamping members and set back axially relative to the bearing segments.

14. A device for the reliable connection of two axially aligned tool parts which can be pressed axially against one another at separating surfaces which face one another by a clamping device, wherein the tool parts can be pressed against one another at their separating surfaces with an inter-clamping of an annular, axially rigid, torsionally yieldable material bridge, wherein the material bridge is closed at its one face and is divided at its other face into several axially rigid and torsionally yieldable bearing segments, which are spaced from one another in a peripheral direction.

15. The device according to claim 14, wherein the material bridge has two closed annular portions which define the faces, and which are connected axially rigid and torsionally yieldable by a plurality of radially continuous axial webs which are spaced from one another in a peripheral direction.

16. The device according to claim 15, wherein web spaces form a rectangular, trapezoidal, circular or oval cross-sectional opening.

17. The device according to claim 16, wherein the axial webs are connected by a binder.

18. The device according to claim 14, wherein the material bridge is materially joined to one of the tool parts in the area of one of the separating surfaces.

19. A device for the connection of two axially aligned tool parts which can be pressed axially against one another at separating surfaces which face one another by a clamping device, wherein the tool parts can be pressed against one another at their separating surfaces with an inter-clamping of an annular, axially rigid, torsionally yieldable material bridge, wherein the material bridge is divided at its two faces into several axially rigid and torsionally yieldable bearing segments which are spaced from one another in a peripheral direction, and engage one another meander-like or zigzag-like from both faces.

20. A device for the connection of two axially aligned tool parts which can be pressed axially against one another at separating surfaces which face one another by a clamping device, wherein the tool parts can be pressed against one another at their separating surfaces with an inter-clamping of an annular, axially rigid, torsionally yieldable material bridge, wherein the material bridge has a plurality of radially continuous axially rigid axial webs which are spaced from one another in a peripheral direction, and which are connected torsionally yieldable by a binder.

21. The device according to claim 20, wherein the binder comprises an elastomer binder.

* * * * *